(12) United States Patent
Zimmermann (10) Patent No.: US 12,331,859 B2
(45) Date of Patent: Jun. 17, 2025

(54) CONNECTION DEVICES FOR CONNECTING A PIPE HAVING AN OUTER PERIPHERAL PROJECTION, USES AND INSTALLATION METHOD

(71) Applicant: AZ Vermögensverwaltung GmbH & Co. KG, Olbernhau (DE)

(72) Inventor: Dirk Zimmermann, Olbernhau (DE)

(73) Assignee: AZ Vermögensverwaltung GmbH & Co. KG, Weilrod (DE)

( * ) Notice: Subject to any disclaimer, the term of this patent is extended or adjusted under 35 U.S.C. 154(b) by 0 days.

(21) Appl. No.: 18/026,291

(22) PCT Filed: Sep. 16, 2021

(86) PCT No.: PCT/DE2021/100763
§ 371 (c)(1),
(2) Date: Mar. 14, 2023

(87) PCT Pub. No.: WO2022/057982
PCT Pub. Date: Mar. 24, 2022

(65) Prior Publication Data
US 2023/0332722 A1    Oct. 19, 2023

(30) Foreign Application Priority Data

Sep. 16, 2020  (DE) ..................... 10 2020 124 183.6
Sep. 16, 2020  (DE) ..................... 10 2020 124 185.2
Sep. 24, 2020  (DE) ..................... 10 2020 124 940.3

(51) Int. Cl.
*F16L 25/00*      (2006.01)

(52) U.S. Cl.
CPC ....... *F16L 25/0036* (2013.01); *F16L 25/0045* (2013.01)

(58) Field of Classification Search
CPC .... F16L 25/0036; F16L 25/0045; F16L 33/26
See application file for complete search history.

(56) References Cited

U.S. PATENT DOCUMENTS 2,323,912 A * 7/1943 Johnson .................. F16L 33/26
29/520
6,260,584 B1    7/2001 Foti
(Continued)

FOREIGN PATENT DOCUMENTS

CA    2254689 A1 * 8/1999 .......... F16L 25/0036
DE    1223636 B  * 8/1966
(Continued)

*Primary Examiner* — Zachary T Dragicevich
*Assistant Examiner* — James A Linford
(74) *Attorney, Agent, or Firm* — Smartpat PLC (57) ABSTRACT

A connection device for a pipe with an outer peripheral projection comprises a connection part with a receptacle for inserting a longitudinal portion of the pipe. The portion comprises the projection, therein. A central axis extends in an insertion direction. A peripheral wall extends around the central axis. A base surface is arranged transversely to the central axis for contacting the projection of the pipe or an end of the pipe. A ring element can be introduced into a gap between the peripheral wall and the pipe such that an axial end of the ring element blocks the projection and secures the pipe against moving out of the receptacle. A securing part is assigned to the connection part and has at least one deformable material portion which can be brought into a blocking position by deformation to form a block against the ring element moving out of the receptacle.

15 Claims, 4 Drawing Sheets

(56) References Cited

U.S. PATENT DOCUMENTS

| | | | |
|---|---|---|---|
| 6,276,728 B1 | 8/2001 | Treichel | |
| 2001/0008342 A1 * | 7/2001 | Kikumori | ........... F16L 25/0036 |
| | | | 285/319 |
| 2010/0007140 A1 | 1/2010 | Duquette et al. | |
| 2010/0090459 A1 | 4/2010 | Duquette et al. | |

FOREIGN PATENT DOCUMENTS

| | | | | |
|---|---|---|---|---|
| DE | 9217131 U1 * | 4/1993 | | |
| DE | 19948007 A1 * | 5/2001 | .......... | F16L 25/0036 |
| DE | 60019377 | 5/2005 | | |
| DE | 69824273 T2 | 8/2005 | | |
| EP | 0222051 A1 * | 5/1987 | | |
| EP | 0390504 A1 * | 10/1990 | | |
| EP | 1180631 A2 * | 2/2002 | .......... | F16L 25/0036 |
| EP | 2019246 A2 | 1/2009 | | |
| EP | 2609356 B1 | 11/2016 | | |
| FR | 2482251 A1 * | 11/1981 | | |
| FR | 2794214 A1 * | 12/2000 | .......... | F16L 19/0243 |
| WO | WO-2008028104 A2 * | 3/2008 | ............ | F16L 13/142 |
| WO | WO-2008064110 A1 * | 5/2008 | .......... | F16L 25/0036 |

\* cited by examiner

CONNECTION DEVICES FOR CONNECTING A PIPE HAVING AN OUTER PERIPHERAL PROJECTION, USES AND INSTALLATION METHOD

CROSS-REFERENCE TO RELATED APPLICATION

This application is a national stage application, filed under 35 U.S.C. § 371, of International Patent Application No. PCT/DE2021/100763, filed on 16 Sep. 2021, which claims the benefit of German Patent Applications No. 10 2020 124 183.6, filed 16 Sep. 2020, No. 10 2020 124 185.2, filed 16 Sep. 2020, and No. 10 2020 124 940.3, filed 24 Sep. 2020.

TECHNICAL FIELD

The present disclosure relates to a connection device for connecting a pipe having an outer peripheral projection, and to an installation method.

BACKGROUND

A connection device for connecting a line with a profiled outer diameter is known from EP 2 019 246 A2.

SUMMARY

The present disclosure proposes at least one possibility for connecting a pipe with an outer peripheral projection in a sealing manner.

This is achieved with a connection device as disclosed herein, with a connection arrangement as disclosed herein, and a method as disclosed herein.

According to one aspect, a connection device for connecting a pipe having an outer peripheral projection, such as a corrugated pipe, is proposed. Preferably, the connection device comprises a connection part with a receptacle for inserting therein a longitudinal portion of the pipe having the projection. In the following description, the term "pipe" is to be understood to mean in particular an elongated hollow body, preferably of any type, in particular with any cross-section, for example round or circular cross-section. The longitudinal portion of the pipe can be an end portion.

In particular, the receptacle has a central axis, preferably extending in an insertion direction. In particular, the receptacle is peripherally delimited by a peripheral wall extending around the central axis. In particular, the receptacle has an insertion opening, for example with an opening surface arranged transverse to the central axis. In particular, the receptacle has a base surface arranged transverse to the central axis. For example, the base surface is a component of a base of the receptacle or forms a base of the receptacle.

In particular, the base surface serves to bring the projection of the pipe or one end of the pipe into contact with it and/or against it, in particular to achieve an axially acting form fit in the insertion direction. Such contact favors a fluid-tight connection between the pipe and the connection part, since a flank of the projection or an end face of one end of the pipe, on the one hand, and the base surface, on the other, can act as sealing surfaces against one another. For example, the base surface and the flank of the projection or the end face of one end of the pipe correspond to one another and/or are each formed to be flat.

In particular, the connection part is formed to be rotationally symmetrical, for example rotationally symmetrical with respect to the central axis of the receptacle. In particular, the connection part is formed to be tubular or sleeve-shaped. In particular, the receptacle is arranged or formed in a tubular or sleeve-shaped portion of the connection part. In particular, at least in the region of the receptacle, the outer periphery of the connection part extends uniformly in the axial direction and/or extends with the same radius. In particular, the outer periphery of the connection part is formed to be concentric with the receptacle. In particular, the central axis of the connection part and the central axis of the receptacle are arranged coaxially relative to one another.

Furthermore, the connection device preferably comprises a ring element. In particular, the ring element is designed to at least partially surround and/or encircle the longitudinal portion of the pipe. The ring element can be of one-piece or multi-piece structure, for example two-piece. For example, the parts of the ring element each form a peripheral portion of the ring element. For example, the ring element is formed by two half-shells. For example, the ring element is formed to be cylindrical, in particular formed as a hollow cylinder. For example, the ring element is sleeve-shaped. For example, the ring element is formed to be round, in particular circular, in cross-section.

In one embodiment, the ring element is designed to be introduced into a gap between the peripheral wall of the receptacle and the pipe or, as the case may be, the inserted pipe in the receptacle, such that an axial end of the ring element acts or serves as a block for the projection. This has the effect, for example, of preventing the pipe from moving out of the receptacle and/or achieving an axially acting form fit against the insertion direction. This is also favors holding the pipe with its projection or one inserted end in contact against the base surface. This, in turn, favors permanently maintaining a fluid-tight connection between the pipe and the connection part.

With a further embodiment, the connection device comprises a securing part. For example, the securing part is assigned to the connection part. In particular, the securing part has a material portion or at least one material portion that comprises or consists of a deformable material. In particular, the material portion or the at least one material portion, as the case may be, is designed to be brought into a blocking position by a deformation, for example to form a block against the ring element moving out of the receptacle. For example, the blocking position is a radial position, preferably with respect to the central axis of the receptacle, in which the material portion or the at least one material portion, as the case may be, acts or can act, as the case may be, as a block against the ring element moving out of the receptacle.

This is a further measure to secure the pipe against moving out of the receptacle. Such measure is now aimed at the ring element, wherein the material portion is intended to prevent the ring element from moving out of the receptacle and/or to achieve an axially acting form fit against the insertion direction. This also favors holding the ring element in its inserted position, in which, for example, the pipe is held with its projection or one inserted end in contact against the base surface of the receptacle. This, in turn, favors permanently maintaining a fluid-tight connection between the pipe and the connection part.

In the present description, the term "deformation" means in particular a change in the shape of a body, such as the material portion described above, as a result of the action of an external force. The deformation can be irreversible. Such a deformation is permanent, for example from the time when the deformable or deformed, as the case may be, body reaches a yield point, and is therefore also referred to as "plastic deformation." Preferably, a prerequisite for plastic deformation is that the material of the body to be deformed is formable. In the present description, the term "formable" or "formability" means in particular the property of the material or of a raw material in general to be permanently formed by external stress. The deformation can be caused by flanging or other cold forming.

In one possible embodiment, the material portion comprises or consists of a formable material and, in particular, is designed to be formed, for example, to form the block described above or a block against the movement of the ring element out of the receptacle. In particular, the material portion is designed to be brought into the blocking position by a forming operation. In particular, the material portion is designed to be formed radially inwardly, in particular to be formed radially inwardly in the direction of the central axis of the receptacle, in order to form the block or a block against the movement of the ring element out of the receptacle. The block created in this manner is, for example, unreleasable and/or permanent.

Due to the formable material portion, a preferably specific change in shape can be used to realize the block for the ring element. Such a change in shape can be achieved in a simple manner by means of a press tool or similar tool. For example, all that is required is that a forming force be applied in the axial direction or in the insertion direction, as the case may be.

It can be provided that the material portion is formed peripherally about the central axis of the receptacle. In particular, the material portion is completely peripheral about the central axis of the receptacle, or peripheral with at least one interruption, or peripheral with at least one peripheral portion.

The securing part can be arranged on the connection part. For example, the securing part is fastened to the connection part. Alternatively, the securing part can be formed on the connection part, in particular integrally molded onto the connection part.

In one possible embodiment, the material portion of the securing part is formed on an axial longitudinal portion of the peripheral wall of the receptacle. In particular, the material portion of the securing part is formed by the axial longitudinal portion of the peripheral wall. This favors a technically simple realization of the securing part, since the securing part can already be manufactured as a component of the connection part during the production of the connection part. This also favors achieving a high level of functional integrity, since the function of the securing part can be performed by the connection part, thus eliminating the need for a separate securing part.

In this embodiment, for example, the peripheral wall of the receptacle is designed to be formed radially inwardly over the axial longitudinal portion, which is present, for example, in the region of the insertion opening of the receptacle, in order to form the block against the ring element moving out of the receptacle. For example, by forming the peripheral wall radially inwardly, a radial taper of the receptacle in the region of the insertion opening is achieved or can be achieved. For example, due to the forming of the peripheral wall radially inwardly, the opening surface of the insertion opening is reduced.

According to one embodiment, in order to promote or facilitate, as the case may be, the forming of the peripheral wall in the axial longitudinal portion, it is provided that the peripheral wall of the receptacle in a region of the axial longitudinal portion has a wall thickness that is smaller than the wall thickness of the peripheral wall in an adjacent axial longitudinal portion. For example, the adjacent axial longitudinal portion extends in the direction of the base surface of the receptacle.

In an alternative embodiment, the securing part is a separate component. One possible embodiment is that the connection part is at least partially encircled by the securing part and, in particular, the material portion of the securing part projects beyond the insertion opening in the axial direction with respect to the central axis of the receptacle. In particular, the connection part also has on the outer periphery a blocking surface, preferably arranged transversely with respect to the central axis of the receptacle, in order to block the securing part against axial movement in the direction of the insertion opening.

One possible embodiment is that the ring element has a radially outwardly projecting and/or outwardly protruding protrusion. In particular, the protrusion is elastically movable and/or elastically deformable in the axial direction of the ring element. In this respect, the protrusion can also be described as an "elastic protrusion."

In the present description, the term "elastic" is to be understood in particular as the property of a material or raw material to change its shape under the action of force and to return preferentially to its original shape when the action of force is removed. In particular, this also means that the protrusion moves and/or deforms in the axial direction of the ring element under the action of force and preferably returns to the original position and/or original shape when the action of force is removed.

In particular, the protrusion or elastic protrusion, as the case may be, is assigned to an axial portion of the ring element, such that the material portion of the securing part is brought into the blocking position against the force of the elastic protrusion, for example to form the block against the ring element moving out of the receptacle of the connection part. For example, when the ring element is introduced into the receptacle of the connection part, the axial portion of the ring element is located in the gap between the peripheral wall of the receptacle and the pipe.

The elastic protrusion counteracts possible loosening of the ring element from its target position with respect to the pipe and any leakage between the connection partners that may be assigned to this. Such loosening can occur due to possible springback, in particular the slight springback of the material portion after it has been deformed into the blocking position. Such springback can cause undesired axial play between the material portion and the ring element, such that the ring element can move slightly out of its target position in the axial direction. Due to the elastic protrusion, a restoring force acts as a pretensioning force on the deformed material portion, on the one hand, and on the ring element, on the other hand, such that, in the event of springback of the deformed material portion, a possible play between the ring element and the material portion is counteracted or such a play is completely avoided.

The protrusion can be in a spring-elastic manner and/or deformable in a spring-elastic manner in the axial direction. The elastic protrusion can circulate around the outer periphery of the ring element; for example, it can circulate completely or circulate with at least one interruption. For example, the elastic protrusion is integrally molded onto the ring element, in particular the outer periphery of the ring element. For example, the ring element with the elastic protrusion is made of or has a spring steel. For example, the protrusion is formed as a peripheral collar or connecting bar or as a peripheral rib.

With a further embodiment, the receptacle has a recess. In particular, the recess is peripheral about the central axis. In particular, the recess is a radial recess. This means, in particular, that the recess deepens in the radial direction with respect to the central axis of the receptacle. For example, the recess is provided on the peripheral wall of the receptacle. For example, the recess is provided in the region of the base surface of the receptacle. For example, a side surface of the recess forms a radial extension of the base surface, for example to increase the contact surface between the pipe or projection, as the case may be, and the base surface and thus the sealing surface.

In particular, the ring element is designed to be introduced into the gap between the peripheral wall of the receptacle and the pipe in the receptacle such that an axial end of the ring element presses against the projection of the pipe to cause a forming of the projection with an inflow of forming material into the recess of the receptacle.

In this embodiment, for example, the recess defines a region into which at least some of the raw material or forming material, as the case may be, can flow in a targeted manner during the forming of the projection. This enables the pipe to be anchored in the receptacle and/or an axially acting force fit or at least an axially acting force fit of the pipe in the receptacle at least against the insertion direction. In addition, this makes it easier to hold the pipe with its projection or one inserted end in contact against the base surface. This, in turn, favors permanently maintaining a fluid-tight connection between the pipe and the connection part.

Such a forming of the projection can be achieved in a simple manner by a pressing tool or a similar tool. For example, all that is required is that a forming force be applied in the axial direction or in the insertion direction, as the case may be.

If the projection of the pipe is formed as a bulge, the bulge of the pipe can be compressed in the axial direction in this manner, in particular compressed together. This makes it easier to form a solid pipe collar extending around the pipe, which improves the sealing function of the connection between the pipe and the connection part, for example.

With a further embodiment, the ring element is formed as a clamping ring and/or upsetting ring. One possible embodiment is that the ring element has a deformation portion. For example, the deformation portion is an end portion of the ring element, in particular an axial end portion of the ring element. For example, the deformation portion is arranged at an end portion of the ring element that faces the receptacle and/or is inserted first when the ring element is inserted into the receptacle of the connection part. In particular, the deformation portion is made of or has a deformable material. For example, the material is plastically or elastically deformable. In particular, the deformation portion is designed to be compressed in the radial direction.

In particular, the peripheral wall of the receptacle is designed over an axial longitudinal portion to act or be used, as the case may be, as a die for the deformation portion of the ring element, for example to bring the deformation portion into contact against a flank of the projection. For example, the flank is a side surface of the projection that is transverse to the central axis of the receptacle.

The deformation portion of the ring element and the axial longitudinal portion of the peripheral wall of the receptacle, which is suitable as a die, make it possible to insert the ring element into the receptacle while deforming the deformation portion and thus to achieve, for example, a force fit between the receptacle and the ring element that acts in the axial direction. In such a case, such force fit counteracts any movement of the ring element out of the receptacle.

If the pipe has further projections and such further projections are arranged one behind the other, as seen in the axial direction, and are present on the longitudinal portion of the pipe to be inserted, a force fit acting in the axial direction can be achieved between the receptacle and the ring element and additionally between the ring element and the pipe in the course of insertion of the ring element and with deformation of the deformation portion. The force fit between the ring element and the pipe can be achieved, for example, by bringing the deformation portion into contact, in particular into press contact, against the apex surface of at least one of the further projections.

It can be provided that the receptacle tapers in the direction of the base surface over the one axial longitudinal portion acting as a die. As a result, it is favored that the axial longitudinal portion acting as a die additionally performs a guiding function when the ring element is inserted into the receptacle, in order to guide the inserted end of the ring element against or in the direction against a flank of the projection of the pipe.

By tapering the axial longitudinal portion, it is thus possible to achieve the deformation portion being formed radially inwardly in such a way that the deformation portion impinges on the flank of the projection but peripherally surrounds the further projections, that is, at most there is a force fit in the radial direction between the ring element and the apex surface of at least one of the further projections. For example, the peripheral wall of the receptacle is formed as an inclined surface over the one axial longitudinal portion acting as a die. This makes it possible to realize the above effects in a technically simple manner.

It can be provided that the one axial longitudinal portion of the peripheral wall acting as a die is arranged between the recess and the one axial longitudinal portion of the peripheral wall formable into the block described above. For example, the one axial longitudinal portion of the peripheral wall acting as a die is the adjacent longitudinal portion described above.

With a further embodiment, the ring element has a pressure surface which extends preferably transversely with respect to the central axis and, in particular, the connection part has a mating surface which extends preferably transversely with respect to the central axis. In particular, the mating surface is designed to be used as an abutment surface for a pressure device, such as a pressing device, to exert a compressive force on the pressure surface of the ring element. This favors technically simple handling in order to insert the ring element into the receptacle and position it in a desired position in the receptacle and/or between the peripheral wall of the receptacle and the inserted longitudinal portion of the pipe.

For example, the pressure surface is formed on the boundary of the ring element or is at least partially formed by the boundary of the ring element. For example, the mating surface is formed on a flank and/or side surface of a notch or indentation or a collar of the connection part, or is at least partially formed thereby.

With a further embodiment, the securing part has a pressure surface and/or a pressing edge in order to cause deformation of the material portion to form the block described above by exerting a compressive force thereto. In particular, the pressure surface and/or the pressing edge are formed and/or arranged to absorb a compressive force acting orthogonally to the central axis of the receptacle or obliquely to the central axis of the receptacle. In particular, the pressure surface is arranged parallel to the central axis or obliquely to the central axis of the receptacle. In particular, the pressure surface is formed on the outer periphery of the securing part or is formed by an outer peripheral portion of the securing part. In particular, the pressure edge is an end-face edge, preferably on the outer periphery of the securing part.

For example, the connection part has a mating surface, preferably extending transversely with respect to the central axis. In particular, the mating surface is designed to be used as an abutment surface for a pressure device, such as a pressing device, in order to exert the compressive force on the pressure surface or the pressing edge, as the case may be, of the securing part. This favors technically simple handling in order to form the material portion of the securing part into a desired shape, for example to form the material portion radially inwardly, such that a block is formed to prevent the ring element from moving out of the receptacle. For example, the mating surface is formed on a flank and/or side surface of a notch or indentation or a collar of the connection part, or is at least partially formed thereby.

The connection part can contain or consist of a metallic material. For example, the connection part has or consists of a metal or a metal alloy. In principle, the connection part can also consist of a plastic material or have a plastic material.

The material of the ring element can be a metallic material that has or consists of a metal or metal alloy. For example, the material of the ring element is a brass material or a steel material or a stainless steel material. In principle, the material of the ring element can also be a plastic material, which has a plastic or consists of a plastic. For example, the material of the ring element is a thermoset.

The material of the material portion can be a metallic material that has or consists of a metal or metal alloy. In principle, the material of the material portion can also be a plastic material, which has a plastic or consists of a plastic. For example, the material of the material portion is a thermoset. For example, the material portion is molded onto the connection part.

With a further embodiment, the connection part has a coupling point flow-connected to the receptacle, for example via a channel, in order to couple the connection part to a port of a further device. For example, the coupling point has a thread in order to connect the connection part to the port of the further device by screwing or a screw connection.

For example, the coupling point has a bore provided with an internal thread in order to connect the connection part to the port of the further device by screwing or a screw connection. In particular, the outer periphery of the connection part has a longitudinal portion, which is formed to be angular in cross-section, in particular polygonal, for example square or hexagonal, for example in order to be able to apply a wrench or similar tool to it.

With a further embodiment, the connection device is formed as a connector for connecting the ends of two pipes with a projection. In particular, it is provided for this purpose that the connection part has a further receptacle that is flow-connected to the receptacle, for example via a channel, and a further ring element working together with the further receptacle is provided. The further receptacle can be formed according to the receptacle described above. The further ring element can be formed in accordance with the ring element described above.

According to a further aspect, a connection arrangement that comprises the connection device described above and a pipe connected thereto having an outer peripheral projection is proposed. The pipe can be the pipe described above.

For example, the pipe is a corrugated pipe. In the present description, the term "corrugated pipe" refers in particular to a pipe that has a diameter that varies in terms of corrugation. For example, a corrugation of the corrugated pipe comprises a corrugation crest, which, viewed in the axial direction, is followed by a flank that opens into a corrugation trough, from which a crest of a further corrugation then starts. Preferably, such corrugation makes the corrugated pipe flexible to a certain extent. In the course of the present description, the term "corrugated pipe" also comprises a corrugated hose.

According to a further aspect, a use of the connection device described above for connecting a pipe having an outer peripheral projection is proposed. For example, the pipe is a corrugated pipe. The pipe can be the pipe or corrugated pipe, as the case may be, described above. Preferably, the pipe is a metallic pipe. In principle, the corrugated pipe can also be a corrugated plastic pipe.

According to a further aspect, a use of the connection device described above for connecting a pipeline to a device performing a technical process is proposed in order to supply a fluid to the device or to discharge a fluid from the device via the pipeline. The device can be a thermotechnical system or a refrigeration system. For example, the device is an air conditioner and/or a heat pump. The pipeline is suitable or used, for example, for transporting refrigerant. The pipeline is also suitable or used, for example, for transporting highly volatile and/or gaseous media, such as hydrogen.

According to a further aspect, a method for mounting a pipe having a peripheral projection to a connection part is proposed. In particular, the method comprises or consists of the steps of:

Inserting a longitudinal portion of the pipe having the projection into a receptacle of the connection part;

Inserting a ring element into a gap between the peripheral wall of the receptacle and the pipe, such that an axial end of the ring element acts as a block for the projection, in order to secure the pipe against moving out of the receptacle;

Forming a material portion from an initial shape into a blocking shape, wherein in the initial shape an insertion opening used for inserting the pipe is unblocked and in the blocking shape the insertion opening is blocked, such that there is a block against the ring element moving out of the receptacle.

In a further development of the method, the material portion is formed radially inwardly in the direction of the central axis of the receptacle, in order to form the block against the movement of the ring element out of the receptacle, that is, to achieve the blocking shape.

According to a further development, in step ii) the ring element is introduced into the gap between the peripheral wall of the receptacle and the pipe in such a way that an axial end of the ring element presses against the projection of the pipe to cause a forming of the projection, in particular with an inflow of forming material into a radial recess of the receptacle.

The method favors an easy-to-handle installation of the pipe to the connection part in order to achieve a durable and tight connection between the pipe and the connection part. In particular, an unreleasable connection between the pipe and the connection part can be achieved in this way.

The connection device described above can be used to carry out the method. The connection part can be the connection part described above in connection with the connection device. Further, the ring element can be the ring element described above in connection with the connection device. Moreover, the material portion can be the material portion described above in connection with the connection device and the material portion described therein in connection with the securing part. In this respect, reference is made to the advantages described in connection with the connection device, which in principle also form the basis of the method.

Further details and features are shown in the following description of several exemplary embodiments based on the drawing.

DETAILED DESCRIPTION

Figures 1, 2:
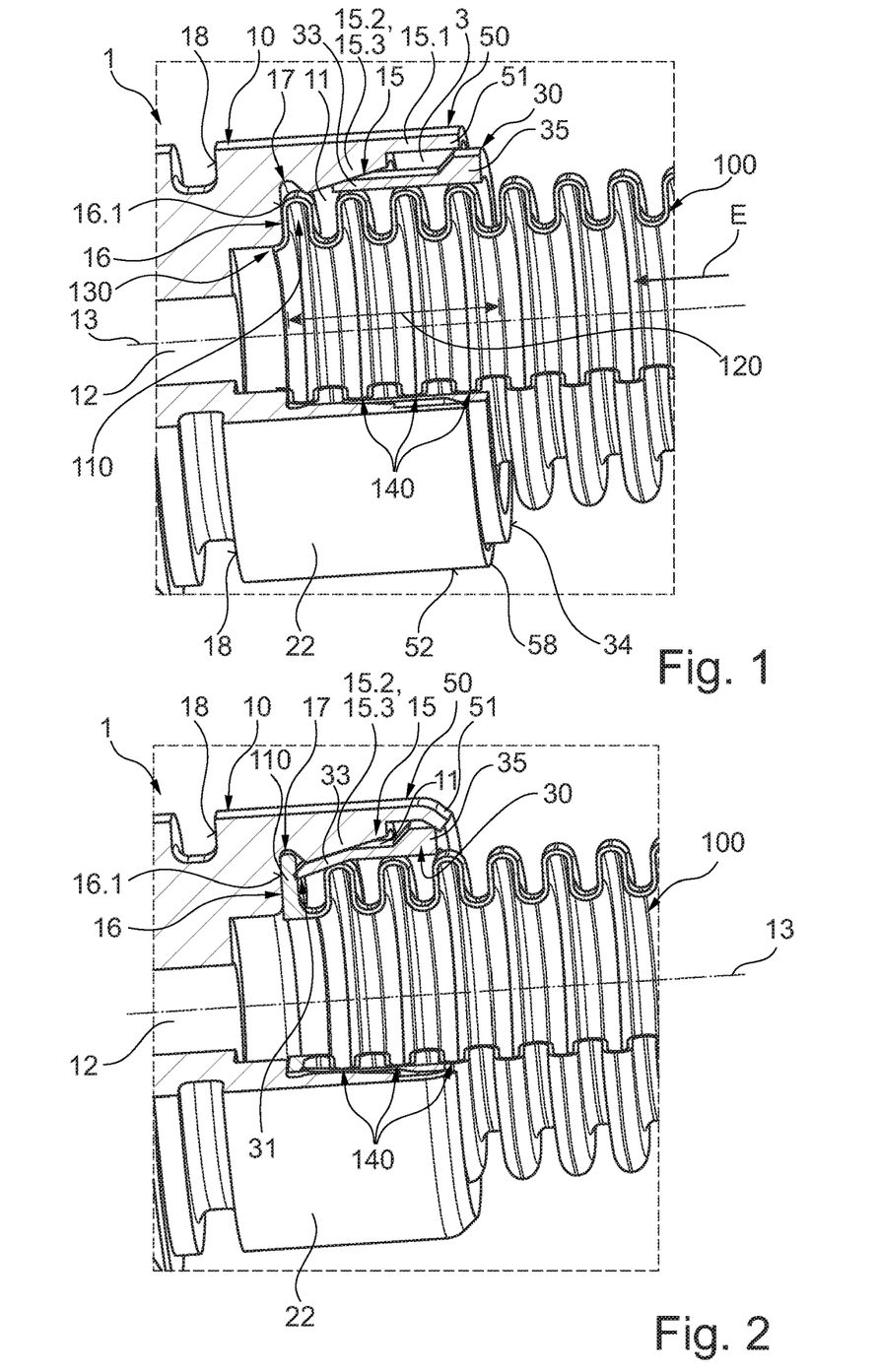
FIG. 1 shows a possible embodiment of a connection device for connecting a pipe with a projection on the outer periphery in an installed state as a partial section.
FIG. 2 shows the connection device of FIG. 1 in an installed final state as a partial section.

FIGS. 1 and 2 show a possible embodiment of a connection device 1 in a perspective view as a partial section. The connection device 1 is suitable for connecting a pipe 100 having an outer peripheral projection 110, such as a corrugated pipe. FIG. 1 shows the connection device 1 together with such a pipe 100 in an installed state. FIG. 2 shows the connection device 1 and the pipe 100 in an installed state. In FIGS. 1 and 2, the connection device 1 is shown as an example of a portion of a connection region with the pipe 100.

Preferably, the connection device 1 comprises a connection part 10 with a receptacle 11 for inserting therein a longitudinal portion 120 of the pipe 100 having the projection 110. Preferably, the longitudinal portion 120 is an end portion. Preferably, the longitudinal portion 120 comprises an end 130 of the pipe 100.

Figure 4:
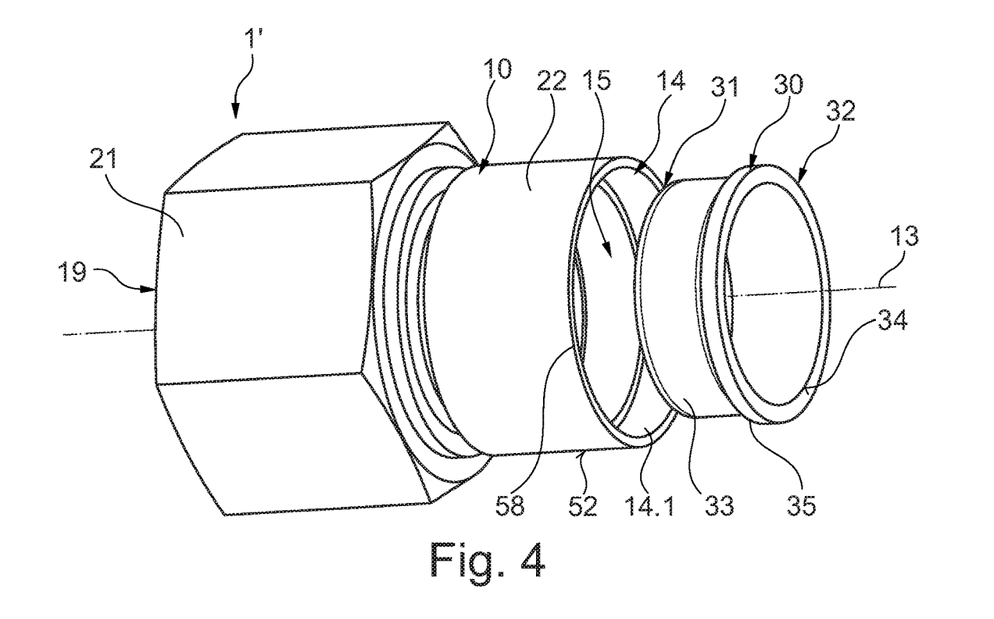
FIG. 4 shows the connection device of FIG. 3 in an exploded view.

Preferably, the receptacle 11 is flow-connected to a coupling point of the connection part 10 (not shown in FIGS. 1 and 2) via a channel 12. Preferably, the receptacle 11 has a central axis 13, in particular a central axis 13 extending in an insertion direction E. Preferably, the receptacle 11 has an insertion opening 14 with an opening surface 14.1 arranged transverse to the central axis 13 (FIG. 4). Preferably, the receptacle 11 is delimited by a peripheral wall 15 extending around the central axis 13. Preferably, the receptacle 11 further comprises a base 16 having, for example, a base surface 16.1 arranged transversely with respect to the central axis 13, in order to bring the projection 110 of the pipe 100 or the end 130 of the pipe 100 into contact therewith.

Preferably, at least in the region of the receptacle 11, the connection part 10 is formed rotationally symmetrical with respect to the central axis 13 of the receptacle 11, for example, it is formed to be sleeve-shaped or tubular. For example, at least in the region of the receptacle 11, the connection part 10 has an outer periphery that extends uniformly in the axial direction. For example, at least in the region of the receptacle 11, the connection part 10 has a constant radius with respect to the central axis 13 of the receptacle 11.

The connection device 1 preferably comprises a ring element 30. Preferably, the ring element 30 is designed to at least partially surround or encircle, as the case may be, the longitudinal portion 120 of the pipe 100. Preferably, the ring element 30 is designed to be inserted into the receptacle 11 in a gap 3 between the peripheral wall 15 of the receptacle 11 and the pipe 100. Preferably, the ring element 30 is designed to be inserted into the gap 3 in such a way that an axial end 31 of the ring element 30 acts as a block for the projection 110, in order to secure the pipe 100 against moving out of the receptacle 11, in particular to secure it in a form-fitting manner.

Preferably, the connection device 1 further comprises a securing part 50 assigned to the connection part 10. Preferably, the securing part 50 has a material portion 51, which comprises or is made of a formable material. For example, the material portion 51 is formed peripherally about the central axis 13 of the receptacle 11. For example, the material portion 51 forms a ring at least partially encircling the pipe 100. Preferably, the material portion 51 is designed to be formed radially inwardly with respect to the central axis 13 to form a block against the movement of the ring element 30 out of the receptacle 10 (FIG. 2).

Figure 3:
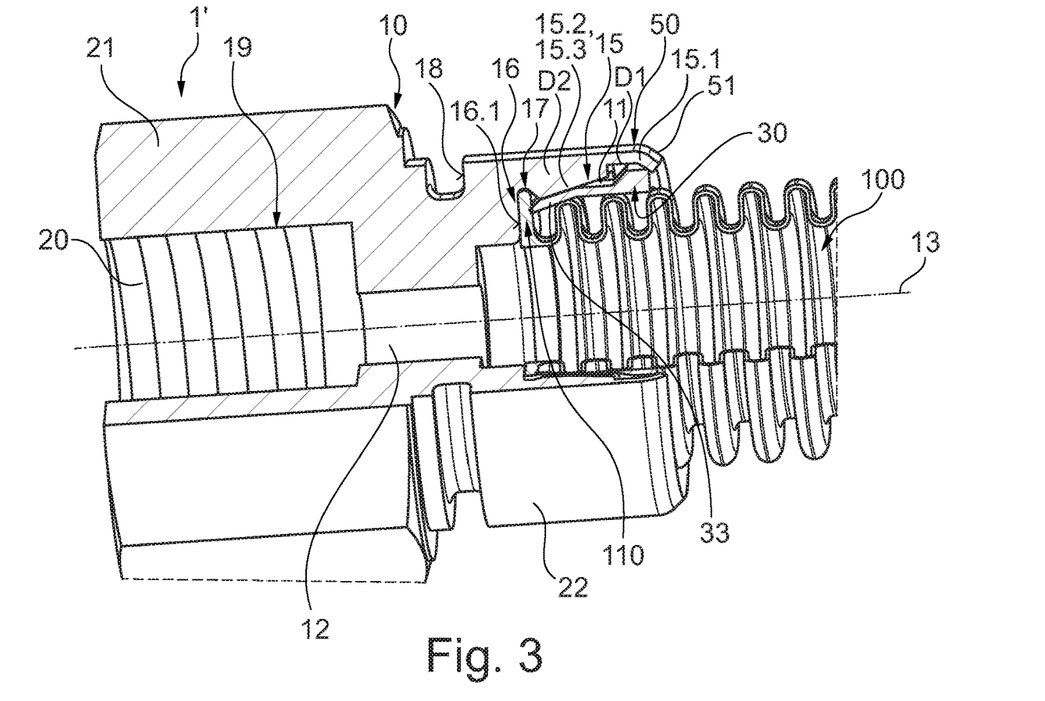
FIG. 3 shows a further possible embodiment of a connection device for connecting a pipe with an projection on the outer periphery as a partial section.

As can be seen from FIGS. 1 and 2, the securing part 50 can be formed on the connection part 10, in particular integrally molded thereon. Further, the material portion 51 of the securing part 50 can be formed on an axial longitudinal portion 15.1 of the peripheral wall 15 of the receptacle 11. To facilitate forming, for example, the peripheral wall 15 of the receptacle 11 is provided in a region of the axial longitudinal portion 15.1 with a wall thickness D1 that is smaller than the wall thickness D2 of the peripheral wall 15 in an adjacent axial longitudinal portion 15.2 extending, for example, in the direction of the base surface 16.1 (FIGS. 1 and 3).

As can be seen in particular from FIG. 1, the receptacle 11 can have a radial recess 17 in the region of the base surface 16.1, which recess is peripherally about the central axis 13. The recess 17 can be a material recess, for example formed by an indentation or notch. For example, the recess 17 can be assigned to the peripheral wall 15 of the receptacle 11, in particular formed there. For example, a side wall of the recess 17 forms a radial extension of the base surface 16.1 of the receptacle 11, that is, an extension of the base surface 16.1 of the receptacle 11 in a radial direction with respect to the central axis 13.

In particular, as can be seen from FIG. 2, the recess 17 can be used to receive forming material resulting, for example, from a deliberate forming of the pipe 100 in the region of the projection 110. This enables an anchoring of the pipe 100 in the receptacle 11 to be achieved due to the recess 17, such that there is a form fit acting in the axial direction. In order to achieve this, the ring element 30 is preferably designed to be introduced into the gap 3 between the peripheral wall 15 of the receptacle 11 and the pipe 100 in the receptacle 11 in such a way that the axial end 31 of the ring element 30 presses against the projection 110 of the pipe 100, in order in this way to bring about a forming of the projection 110 with an inflow of forming material into the recess 17 of the receptacle 11.

As can be seen in particular from FIGS. 1 and 2, the ring element 30 can have a deformation portion 33, which has or is made of a deformable material and is preferably designed to be compressed in the radial direction. Accordingly, the peripheral wall 15 of the receptacle 11 can be designed, at least over an axial longitudinal portion 15.3, to act as a clamping surface for the deformation portion 33. This makes it possible, when the ring element 30 is inserted into the receptacle 11, for the deformation portion 33 to slide along the axial longitudinal portion 15.3 of the peripheral wall 15 under radial forming, thereby causing the deformation portion 33 to clamp against the axial longitudinal portion 15.3. In this way, for example, a force fit acting in the axial direction is achieved, by which the ring element 30 is secured in a force-fitting manner against moving out of the receptacle 11.

As a supplement or alternative, the peripheral wall 15 of the receptacle 11 can be designed at least over an axial longitudinal portion, in particular over the axial longitudinal portion 15.3, to act as a die for the deformation portion 33 of the ring element 30. Preferably, the peripheral wall 15 is formed as a die over such axial longitudinal portion 15.3 in such a way that, when the ring element 30 is inserted into the receptacle 11, the deformation portion 33 is formed by the die in a radially inward direction to such an extent that the deformation portion 33 is brought into contact against a flank of the projection 110 or at least points in the direction against the flank of the projection 110. Such a forming lends itself to the pipe 100 having further projections 140, which, viewed in the direction of the longitudinal extension of the pipe 100 and starting from the projection 110, are arranged one behind the other. Such a pipe 100 can be, for example, a corrugated pipe.

The axial longitudinal portion 15.3 of the peripheral wall 15 acting as a die can be formed in such a way that the deformation portion 33 of the ring element 30 is brought into contact against one flank, specifically on the end face, of the projection 110 or at least points in the direction against one flank of the projection 110, but the further projections 140 are encircled by the deformation portion 33 or, as the case may be, point with their apex surface in the direction against the inner periphery of the ring element 30. It can also be provided that the deformation portion 33 is in a clamping connection, on the one hand, with respect to the peripheral wall 15 of the receptacle 11, in particular the axial longitudinal portion 15.3, and, on the other hand, with respect to the pipe 100, such that the pipe 100 and the ring element 30 are held in a force-fitting manner in the receptacle 11 against moving out.

In order to achieve the above-described forming or deformation, as the case may be, of the deformation portion 33, the receptacle 11 is preferably formed to taper over the one axial longitudinal portion 15.3 in the direction of the base surface 16.1. For example, the peripheral wall 15 of the receptacle 11 is formed as an inclined surface over the one axial longitudinal portion 15.3.

Preferably, the ring element 30 has an annular base body 35. Preferably, the deformation portion 33 is arranged thereon, in particular integrally molded thereon. Preferably, the deformation portion 33 joins the base body 35 in the direction of a central axis of the ring element 30. Preferably, the base body 35 has a thicker wall compared to the deformation portion 33. Preferably, the axial extension of the deformation portion 33 in the direction of the central axis of the ring element 30 is greater than the axial extension of the base body 35.

Preferably, the ring element 30 has a pressure surface 34 against which a compressive force acting in the insertion direction E can be applied in order to insert the ring element 30 into the receptacle 11 of the connection part 10. Preferably, the pressure surface 34 extends transversely with respect to the central axis of the ring element 30. Preferably, the pressure surface 34 is formed on the base body 35 of the ring element 30. Preferably, the pressure surface 34 is formed at one end 32 of the ring element 30, which is arranged opposite the insertion end 31 of the ring element 30 (FIG. 4).

In order to realize the forming described above of the material portion 51 for forming the axial block for the ring element 30, a pressure surface 52 and/or a pressure edge 58 is preferably provided. The pressure surface 52 or the pressure edge 58, as the case may be, are preferably arranged in such a way that, by exerting a compressive force thereon or thereagainst, the material portion 51 is formed in a radially inward direction and, preferably, the block is formed thereby. The forming can be based on flanging or other cold forming of the material portion 51.

Preferably, the pressure surface 52 is formed on the outer periphery of the securing part 50 or is formed by an outer peripheral portion of the securing part 50. For example, the pressure surface 52 is arranged in the region of the boundary of the insertion opening 14. Preferably, the pressure edge 58 is an edge on the end face, preferably on the outer periphery of the securing part 50. For example, the pressure edge 58 is arranged in the region of the boundary of the insertion opening 14 and/or is formed by or formed on the outer edge of the boundary.

A possible functionality of the connection device 1 of FIGS. 1 and 2 for connecting the pipe 100 described above is briefly explained below:

The pipe 100 is inserted into the receptacle 11 of the connection part 10 such that the projection 110 of the insertion pipe 100 is brought into contact with a flank against the base surface 16.1 of the receptacle 11 or one end 130 of the pipe 100 (FIG. 1). The ring element 30 is then introduced into the gap 3 between the peripheral wall 15 of the receptacle 11 and the pipe 100. For example, a compressive force is applied to the pressure surface 34 of the ring element 30 in the insertion direction E for this purpose.

Preferably, such a high compressive force is applied that the ring element 30 is moved along the axial longitudinal portion 15.3 of the receptacle 11 acting as a die under a radially inwardly directed forming and, for example, presses with one axial end 31 against the projection 110 of the pipe 100, preferably bridging the further projections 140, to the extent present.

The compressive force is also dimensioned so high that axial compression of the projection 110 occurs, specifically in such a way that forming material flows into the radial recess 17 of the receptacle 11 and an anchoring of the pipe 100 in the recess 17 occurs. This provides a permanent anchoring of the pipe 100 in the receptacle 11 of the connection part 10. In addition, the base surface 16.1, together with the flank of the projection 110 of the pipe 100 that abuts it, forms a fluid-tight seal between the pipe 100 and the connection part 10.

In a further step, the material portion 51 of the securing part 50 is now formed from its initial shape into a blocking shape. In the initial shape, the insertion opening 14 of the receptacle 11 is unblocked by the material portion 51, whereas in the blocking form, the insertion opening 14 is blocked by the formed material portion 51, such that there is a block against the ring element 30 moving out of the receptacle 10. For this purpose, for example, a compressive force, preferably acting obliquely, is applied to the pressure edge 58. As a supplement or alternative, a compressive force can be applied to the pressure surface 52, which is directed, for example, orthogonally to the central axis 13 or obliquely thereto.

The compressive force required to connect the pipe 100 to the connection device 1 can be generated by a pressure device or pressing device. For this purpose, the mating surface 18 provided on the connection part 10 can be used as an abutment for the pressure device.

FIGS. 3 and 4 show a further possible embodiment of a connection device 1' in a partial section (FIG. 3) and in an exploded view (FIG. 4). Components of the connection device 1', which are identical in structure or function to components of the connection device 1 of FIGS. 1 and 2, are provided with the same reference signs; in this respect, reference is made to the description of the connection device 1 of FIGS. 1 and 2. In FIG. 3, the connection device 1' is in the installed final state as already shown in FIG. 2 and described with respect to the connection device 1.

In the connection device 1', by way of example, the connection part 10 is provided with a coupling point 19 for coupling the connection part 10 to a port of a further device. Preferably, the coupling point 19 is flow-connected to the receptacle 11 via the channel 12, for example, in order to be able to supply a fluid or medium transported via the pipe 100 and the channel 12 to the further device via the coupling point 19 or to be able to discharge it therefrom.

Preferably, the coupling point 19 is formed on an extension 21, which is arranged on a base portion 22 comprising the receptacle 11, in particular is integrally molded. The coupling point 19 can have a bore provided with an internal thread 20, for example to connect the connection part 10 to the port of the further device by screwing or a screw connection. In order to facilitate screwing, the connection part 10 can have an angular outer periphery, for example in the region of the extension 21. This allows a tool, such as a wrench, to be applied.

Figure 5:
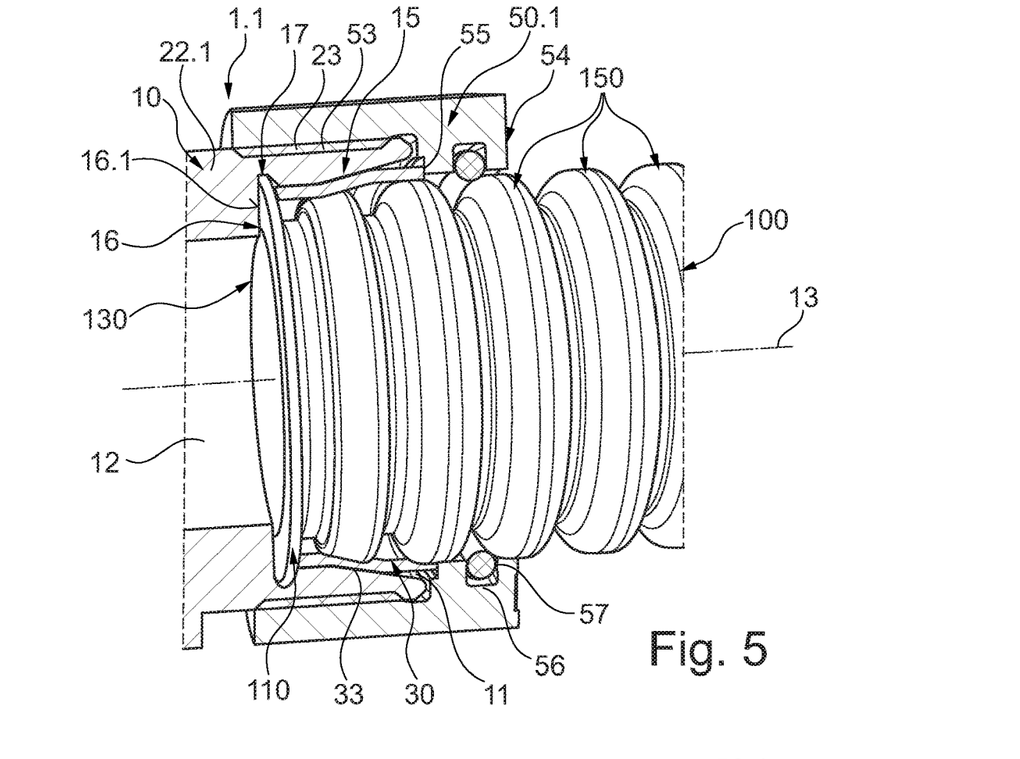
FIG. 5 shows a further possible embodiment of a connection device for connecting a pipe with an projection on the outer periphery in a longitudinal portion.

FIG. 5 shows a further possible embodiment of a connection device 1.1 in a longitudinal portion. Components of the connection device 1.1 of FIG. 5, which are identical or functionally identical to components of the connection device 1 of FIGS. 1 and 2, are provided with the same reference signs; in this respect, reference is made to the description of the connection device 1 of FIGS. 1 and 2. In FIG. 5, the connection device 1.1 is in the installed final state as already shown in FIG. 2 and described with respect to the connection device 1.

The connection device 1.1 of FIG. 5 differs from the connection device 1 of FIGS. 1 and 2, among other things, in that a separate securing part 50.1 is provided to form a block against the ring element 30 moving out of the receptacle 11. For example, the securing part 50.1 is provided with a thread 53 and is designed to be screwed onto a corresponding thread 23 on a base portion 22.1 of the connection part 10 comprising the receptacle 11.

Preferably, the securing part 50.1 is designed to at least partially surround or encircle, as the case may be, the pipe 100. Preferably, the securing part 50.1 is formed to be annular and/or sleeve-shaped. Preferably, an axial portion of the securing part 50.1 has the thread 53. Preferably, an axial portion adjacent thereto has a radially inwardly directed protrusion 54, wherein a side surface of the protrusion 54 forms a blocking surface 55, which serves as a block to prevent the ring element 30 from moving out of the receptacle 11 when the securing part 50.1 is screwed onto the connection part 10.

Preferably, the blocking surface 54 also serves as a pressure surface in order to exert a compressive force acting in the direction of the central axis 13 on the ring element 30 in the course of a screwing movement or rotational movement, as the case may be, of the securing part 50.1 relative to the base portion 22.1 extending about the central axis 13 and, in this way, to press the ring element 30 against the projection 110 of the pipe 100. Preferably, this also allows the projection 110 of the pipe 100 to be axially compressed, in particular with an inflow of forming material into the recess 17 of the receptacle 11.

Preferably, the protrusion 54 has a peripheral groove 56 in which a spring-elastic ring element 57, in particular a ring element 57 acting in a spring-elastic manner in the radial direction, is received, in particular loosely received. If the pipe 100 is a corrugated pipe and/or has further projections 150, the ring element 57 serves as a securing device to prevent the pipe 100 from moving out of the receptacle 11 as long as the ring element 30 does not yet perform a blocking function with respect to the pipe 100 or the projection 110, as the case may be, in the axial direction. This is effected in such a way that the ring element 57 automatically plunges into a recess between two adjacent projections 150 or, as the case may be, into a shaft bottom between two adjacent shafts due to its spring elastic effect. In this position, the ring element 57 is supported, on the one hand, against a flank of the further projection 150 or of the shaft and, on the other hand, against a side wall of the groove 56 in the axial direction.

Figure 6:
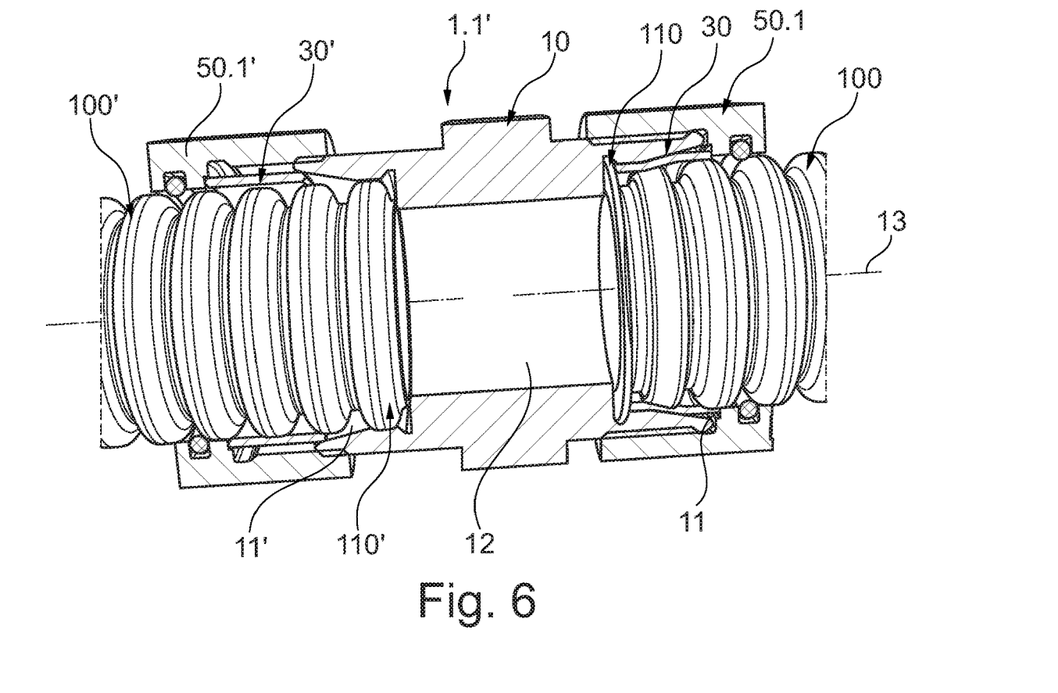
FIG. 6 shows the connection device of FIG. 5 as part of a connector for connecting the ends of two pipes with outer peripheral projection in a longitudinal portion.

FIG. 6 shows a further possible embodiment of a connection device 1.1' in a longitudinal portion. Components of the connection device 1.1' of FIG. 6, which are identical or functionally identical with components of the connection device 1 of FIGS. 1 and 2 and/or the connection device 1.1 of FIG. 5, are provided with the same reference signs; in this respect, reference is made to the description of the connection device 1 of FIGS. 1 and 2 or the connection device 1.1 of FIG. 5, as the case may be.

The connection device 1.1' of FIG. 6 is formed as a connector for connecting the ends of two pipes with a projection. For example, in this case the connection part 10 has the receptacle 11 already described above and a further receptacle 11' flow-connected thereto, preferably via the channel 12. For example, the pipe 100 is connected to the receptacle 11 in the manner described above.

Preferably, a further ring element 30' works together with the further receptacle 11' to connect thereabove a further pipe 100' with its projection 110'. A further separate securing part 50.1' can be provided on the further receptacle 11'. For example, the further securing part 50.1' is formed to correspond to the securing part 50.1. For example, using the further ring element 30', the further securing part 50.1' works together with the further receptacle 11' in the way that the securing part 50.1, the ring element 30 and the receptacle 11 work together.

In FIG. 6, the pipe 100, the ring element 30 and the securing part 50.1 are in an installed final state with respect to the receptacle 11, whereas the further pipe 100', the further ring element 30' and the further securing part 50.1' are still in an installed state with respect to the further receptacle 11'.

Figure 7:
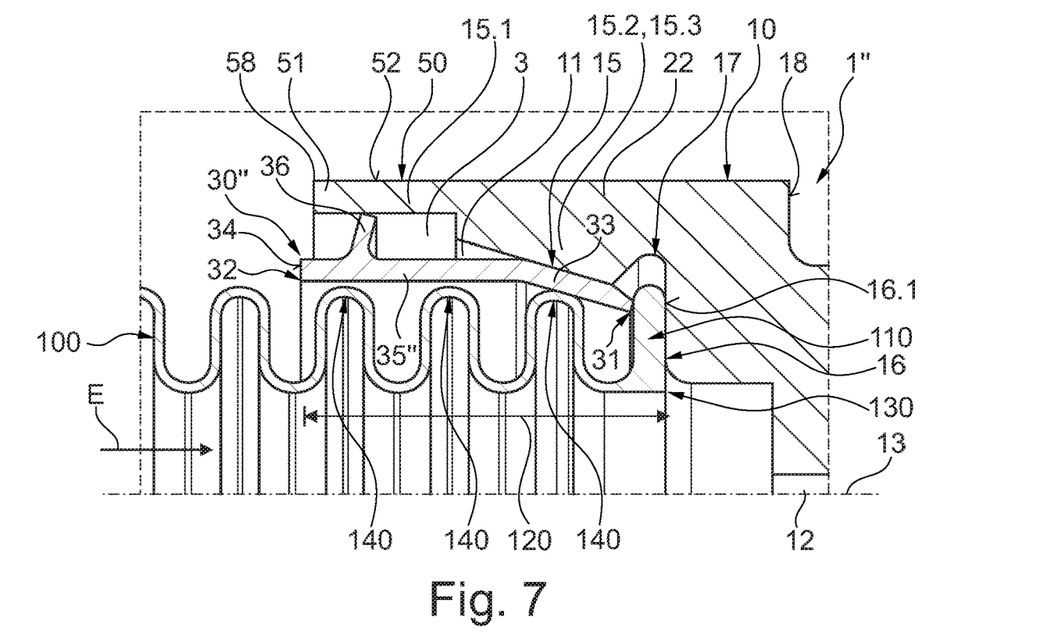
FIG. 7 shows a further possible embodiment of a connection device for connecting a pipe with an outer peripheral projection in an installed state.

FIG. 7 shows a further possible embodiment of a connection device 1" in a longitudinal portion and in representation of a half side of the connection device 1″. The connection device 1″ can be a modification of the connection device 1 of FIGS. 1 and 2. Components of the connection device 1″ which are identical or functionally identical to components of the connection device 1 of FIGS. 1 and 2, are provided with the same reference signs; in this respect, reference is made to the description of the connection device 1 of FIGS. 1 and 2.

The connection device 1″ of FIG. 7 differs from the connection device 1 of FIGS. 1 and 2, among other things, in that a ring element 30″ with a radially outwardly projecting and/or outwardly protruding protrusion 36 is provided. Preferably, the protrusion 36 is elastically movable and/or elastically deformable in the axial direction of the ring element 30″. Preferably, the ring element 30″ has an annular base body 35″ on which the protrusion 36 is arranged, in particular integrally molded. Preferably, the deformation portion 33 is further arranged thereon, in particular molded thereon. Preferably, the deformation portion 33 joins the base body 35″ in the direction of a central axis of the ring element 30 or forms an axial end portion of the base body 35″.

Preferably, the protrusion 36 is assigned to an axial portion of the ring element 30″. Preferably, the axial portion is arranged behind the deformation portion 33, viewed in the insertion direction E. Preferably, the protrusion 36 is arranged such that, when the ring element 30″ is introduced into the receptacle 11 of the connection part 10, the axial portion or protrusion 36, as the case may be, is located in the gap 3 between the peripheral wall 15 of the receptacle 11 and the pipe 100. In FIG. 7, this installed state is shown as an example, wherein the ring element 30″ is already brought into an active position against the projection 110 of the pipe 100, in particular in the manner described for FIGS. 1 and 2.

Provided that the material portion 51 is now brought into the blocking position, as already described, for example, with respect to FIGS. 1 and 2, in the case of the connection device 1″ the material portion 51 is moved under elastic movement or elastic deformation, as the case may be, of the protrusion 36. The material portion 51 is thus brought into the blocking position against the force of the protrusion 36. Such installed state is shown as an example in FIG. 8.

Figure 8:
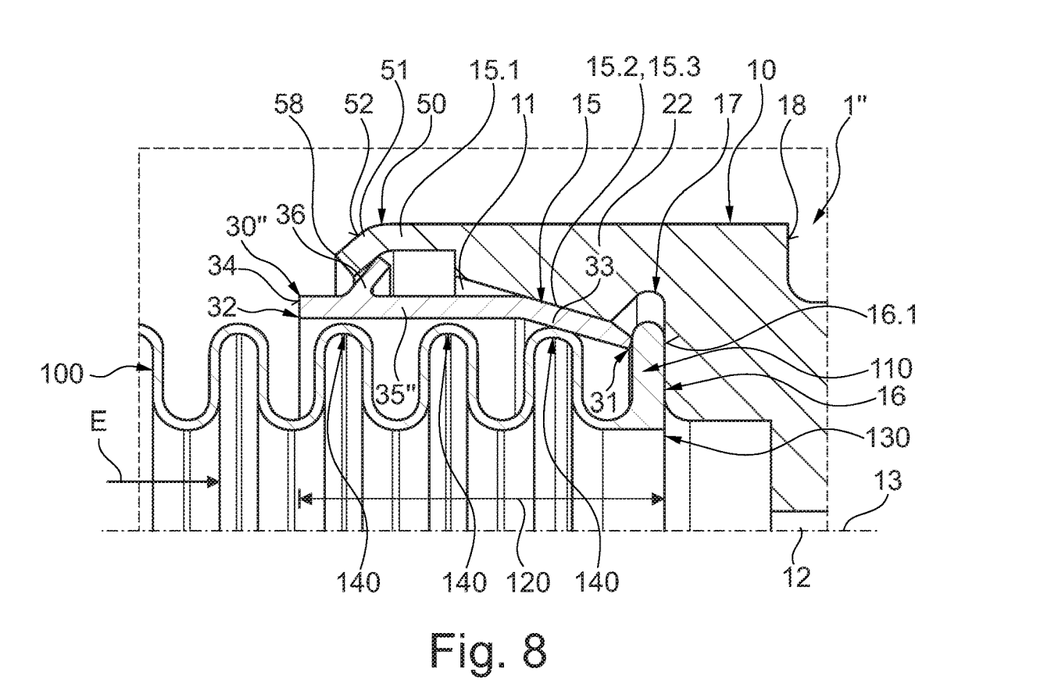
FIG. 8 shows the connection device of FIG. 7 in an installed final state.

Thus, in the blocking position of the material portion 51, a restoring force of the protrusion 36 acts as a pretensioning force on the material portion 51. The force emanating from the protrusion 36 makes it possible for the ring element 30″ to remain held in the active position against the pipe 100 in the event of a possible springback of the formed material portion 51, and thus a permanently fluid-tight connection is favored.

The protrusion 36 can be deformable in a spring-elastic manner in the axial direction. The protrusion 36 can circulate around the outer periphery of the annular element 30″, for example, circulate completely or circulate with at least one interruption. For example, the ring element 30″ having the protrusion 36 is made of or has a spring steel. For example, the protrusion 36 is formed as a peripheral collar or connecting bar or as a peripheral rib.

In the present specification, reference to a particular aspect, embodiment or design means that a particular feature or characteristic described in connection with that aspect, embodiment or design is at least included therein is, but need not necessarily be included in all aspects or embodiments or designs.

The use of any or all examples or exemplary language in the text is intended only to illuminate the disclosure and is not a limitation as to the scope of the disclosure, unless otherwise claimed. Nor is any expression or wording of the description to be understood as referring to an element that is not claimed but is substantial to practice.

REFERENCE SIGNS

1 Connection device
1′ Connection device
1″ Connection device
1.1 Connection device
1.1′ Connection device
3 Gap
10 Connection part
11 Receptacle
11′ Further receptacle
12 Channel
13 Central axis
14 Insertion opening
14.1 Opening surface
15 Peripheral wall
15.1 Axial longitudinal portion
15.2 Adjacent axial longitudinal portion
15.3 Axial longitudinal portion
16 Base
16.1 Base surface
17 Recess
18 Mating surface
19 Coupling point
20 Internal thread
21 Extension
22 Base portion
22.1 Base portion
23 Thread
30 Ring element
30′ Further ring element
30″ Ring element
31 End
32 End
33 Deformation portion
34 Pressure surface
35 Base body
35″ Base body
36 Protrusion
50 Securing part
50.1 Securing part
50.1′ Further securing part
51 Material portion
52 Pressure surface
53 Thread
54 Protrusion
55 Blocking surface
56 Groove
57 Spring-elastic ring element
58 Pressure edge
100 Pipe
100′ Further pipe
110 Projection
110′ Projection
120 Longitudinal portion
130 End
140 Further projections
E Insertion direction
D1 Wall thickness
D2 Wall thickness

The invention claimed is:

1. A connection device (1) for connecting a pipe (100) having an outer peripheral projection (110) arranged in a longitudinal portion (120) thereof, the connection device (1) comprising:
   a connection part (10) with a receptacle (11) for inserting therein the longitudinal portion (120) of the pipe (100) with the outer peripheral projection (110),
      wherein the receptacle (11) has a central axis (13) which extends in an insertion direction (E) and is peripherally delimited by a peripheral wall (15) which extends around the central axis (13),
      wherein the receptacle (11) also has a base surface (16.1), which is arranged transversely with respect to the central axis (13), and configured to bring the outer peripheral projection (110) of the pipe (100) or an end (130) of the pipe (100) into contact therewith;
   a ring element (30) which is designed to be introduced into a gap (3) between the peripheral wall (15) of the receptacle (11) and the pipe (100) in the receptacle (11) in such a way that an axial end (31) of the ring element (30) acts as a block for the outer peripheral projection (110) in order to secure the pipe (100) against moving out of the receptacle (11); and
   a securing part (50) which is assigned to the connection part (10) and has a material portion (51),
      wherein the material portion (51) comprises or consists of a deformable material and is designed to be brought into a blocking position by deformation in order to form a block against the ring element (30) moving out of the receptacle (10),
   wherein the connection part (10) and the securing part (50) are one piece.

2. The connection device according to claim 1,
   wherein the material portion (51) comprises or consists of a formable material and is designed to be brought into the blocking position by forming, and
   wherein the material portion (51) is configured to deform when the ring element (30) is inserted into the gap (3).

3. The connection device according to claim 2, wherein the material portion (51) extends radially inwardly, in order to form the block against movement of the ring element (30) out of the receptacle (10).

4. The connection device according to claim 1, wherein the material portion (51) is formed peripherally about the central axis (13) of the receptacle (11).

5. The connection device according to claim 1, wherein the material portion (51) of the securing part (50) is formed on an axial longitudinal portion (15.1) of the peripheral wall (15) of the receptacle (11).

6. The connection device according to claim 5, wherein the peripheral wall (15) of the receptacle (11) in a region of the axial longitudinal portion (15.1) has a wall thickness (D1) that is smaller than a wall thickness (D2) of the peripheral wall (15) in an adjacent axial longitudinal portion (15.2), which extends in a direction of the base surface (16.1).

7. The connection device according to claim 1, wherein the ring element (30") has a radially outwardly protruding protrusion (36), which is elastically movable and/or elastically deformable in an axial direction of the ring element (30") and is assigned to an axial portion of the ring element (30"), which, when the ring element (30") is introduced, is located in the gap (3) between the peripheral wall (15) of the receptacle (11) and the pipe (100), such that the material portion (51) of the securing part (50) is brought into the blocking position against a force of the elastic protrusion (36).

8. The connection device according to claim 1,
   wherein the receptacle (11) has a radial recess (17) in a region of the base surface (16.1), which recess (17) is peripherally about the central axis (13),
   wherein the peripheral wall (15) includes
      a cylindrical portion (15.1) proximal to the material portion (51) and
      a conical portion (15.3) between the cylindrical portion (15.1) and the radial recess (17), and
   wherein the ring element (30) is designed to be introduced into the gap (3) between the peripheral wall (15) of the receptacle (11) and the pipe (100) in the receptacle (11) in such a way that an axial end (31) of the ring element (30) presses against the outer peripheral projection (110) of the pipe (100), in order in this way to bring about a forming of the outer peripheral projection (110) with an inflow of forming material into the recess (17) of the receptacle (11), and
   wherein the ring element (30) includes an annular base body (35) and a deformation portion (33), the deformation portion (33) being configured to slide along the conical portion (15.3) when the ring element (30) is inserted into the gap (3).

9. A connection arrangement with the connection device (1) according to claim 1 and a corrugated pipe (100) with an outer peripheral projection (110) connected thereto.

10. A connection device (1) for connecting a pipe (100) having an outer peripheral projection (110) arranged in a longitudinal portion (120) thereof, the connection device (1) comprising:
    a connection part (10) with a receptacle (11) for inserting therein the longitudinal portion (120) of the pipe (100) with the outer peripheral projection (110),
       wherein the receptacle (11) has a central axis (13) which extends in an insertion direction (E),
       wherein the receptacle (11) is peripherally delimited by a peripheral wall (15) which extends around the central axis (13) and has a base surface (16.1) arranged transversely with respect to the central axis (13), in order to bring the outer peripheral projection (110) of the pipe (100) into contact therewith,
       wherein the receptacle (11) further has a radial recess (17) in a region of the base surface (16.1), which radial recess (17) is peripherally about the central axis (13),
       wherein the peripheral wall (15) comprises a conical portion (15.3) that tapers towards the base surface (16.1), and
       wherein the radial recess (17) extends radially further outwardly than an adjoining end of the conical portion (15.3); and
    a ring element (30) which is designed to be introduced into a gap (3) between the peripheral wall (15) of the receptacle (11) and the pipe (100) in the receptacle (11) in such a way that an axial end (31) of the ring element (30) presses against the outer peripheral projection (110) of the pipe (100), in order in this way to bring about a forming of the outer peripheral projection (110) with an inflow of forming material into the radial recess (17) of the receptacle (11).

11. A connection device according to claim 10,
    wherein the ring element (30) has a deformation portion (33), wherein the deformation portion (33) comprises or consists of a deformable material and is designed to be compressed in the radial direction, and wherein conical portion (15.3) acts as a die for the deformation portion (33) of the ring element (30) in order to bring the deformation portion (33) into contact against a flank of the outer peripheral projection (110).

12. The connection device according to claim 10, wherein the ring element (30) has a pressure surface (34) which extends transversely with respect to the central axis (13) and the connection part (10) has a mating surface (18) which extends transversely with respect to the central axis (13), wherein the mating surface (18) is designed as an abutment surface for a pressure device, in order to exert a compressive force acting in the insertion direction (E) on the pressure surface (34) of the ring element (30).

13. The connection device according to claim 10, wherein a securing part (50) has a pressure surface (52) and/or a pressing edge (58) in order to cause deformation of a material portion (51) to form a block by exerting a compressive force thereto, and wherein a mating surface (18) is provided which is designed to be used as an abutment surface for a pressure device, in order to exert the compressive force on the pressure surface (52) and/or the pressing edge (58).

14. The connection device according to claim 10, wherein the connection part (10) has a coupling point (19) flow-connected to the receptacle (11) in order to couple the connection part (10) to a port of a further device.

15. The connection device according to claim 10, wherein the connection device (1) is formed as a connector for connecting the ends of two pipes with a projection, wherein the connection part (10) has a further receptacle flow-connected to the receptacle (11) and a further ring element working together with the further receptacle.

* * * * *